Dec. 17, 1935.　　　　F. W. YEAGER　　　　2,024,559
PIPE COUPLER HOUSING AND METHOD OF APPLYING SAME
Filed July 19, 1933
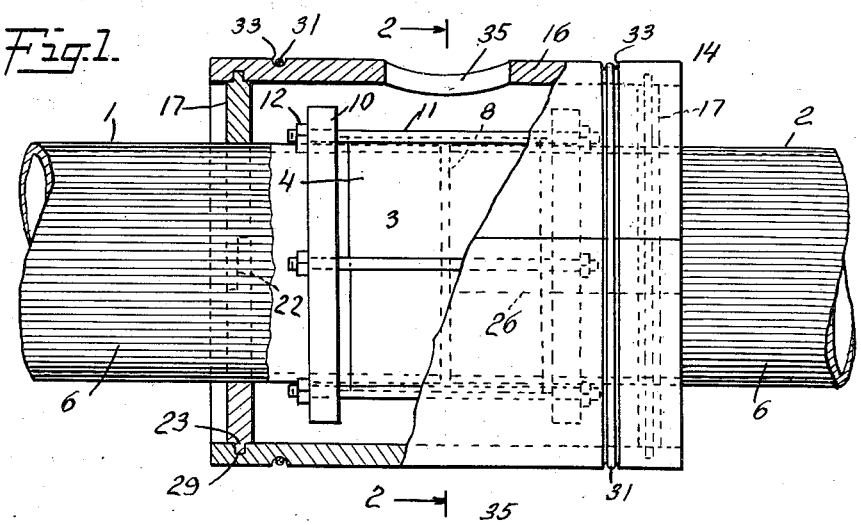
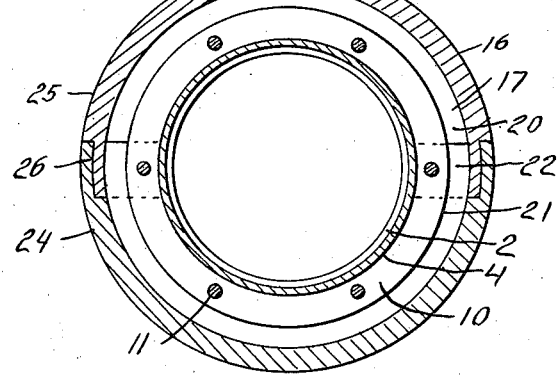
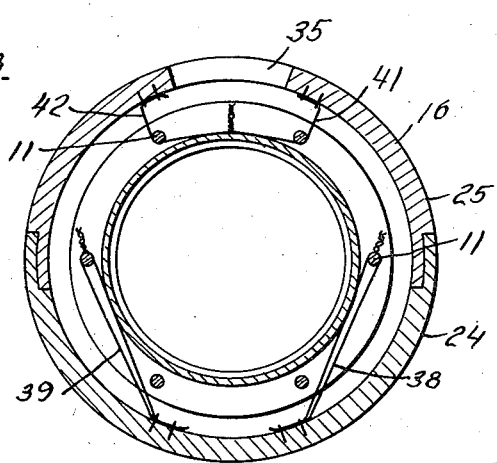
INVENTOR
Frank W. Yeager
BY
ATTORNEY Patented Dec. 17, 1935

2,024,559

UNITED STATES PATENT OFFICE 2,024,559

PIPE COUPLER HOUSING AND METHOD OF APPLYING SAME

Frank William Yeager, Grantwood, N. J., assignor to The Barrett Company, New York, N. Y., a corporation of New Jersey Application July 19, 1933, Serial No. 681,047

9 Claims. (Cl. 285—100)

This invention relates to the protection of pipe lines and more particularly to pipe-coupler housings and methods for protecting pipe couplers.

One object of this invention is to provide a rigid, durable pipe-coupler housing of simple design and construction which can readily be manufactured at a minimum cost.

Another object of this invention is to provide a rigid durable pipe-coupler housing composed of sections of waterproof fibrous material provided with lapped joints forming when assembled a tight cylindrical shell about the coupling, the individual sections being readily fabricated from flat shapes thus simplifying the manufacture of the housing.

Another object of this invention is to provide a housing for protecting pipe couplers having the members holding the housing about the coupling protected against corrosion and other soil influences. In a preferred embodiment of this invention, the members are disposed interiorly of the coupler housing and are covered by the protective material within the housing. Thus, the fastening members are protected by both the housing walls and the protective material against soil stresses, corrosion, etc.

Another object of this invention is to provide a novel method for holding a coupler housing in position around a coupler.

Other objects and advantages will appear from the following detailed description of this invention.

In the installation of pipe lines, especially the laying of underground lines in which steel piping is employed, it has been found desirable to apply a protective coating to protect the pipes against the destructive action of corrosive agents and the like to which they may be exposed. The investment in constructing underground pipe lines is large and if some means were not provided for protecting the pipe against destructive action such as corrosion, the replacement and repair costs would be excessive. At the present time it is standard practice in laying pipe lines to coat the exposed surfaces of the pipes with resistant protective materials such as bituminous paints, mastics, or enamels.

It is customary to coat underground pipe with such material at the side of the ditch in which it is to be laid. This may be done by rotating a pipe section on a rolling rig and pouring or spreading the protective material thereon in a fluid heated condition. When the material cools it forms a hard protective coating over the pipe surface. The coated sections may then be coupled together by some form of expansion joint or coupler, such as a Dresser coupler. The coupler makes a tight joint and at the same time permits a certain amount of relative movement or sliding between the component parts of the pipe line. To facilitate assembly of couplers and pipe, it is customary in coating the pipes with the protective material to leave a portion, about 6 or 10 inches, at the ends of each length of pipe bare of coating material.

After connecting the various coated pipe sections with the couplers, it is similarly necessary to protect the exposed uncoated areas of the pipe sections and the exposed portions of the couplers against corrosion before the pipe is lowered into the ditch and covered with soil. Previous to this invention this has been done by coating these parts with a bituminous paint or enamel, preferably softer and more fluid than that used to cover the main body of the pipe. The use of a soft coating has been necessitated by the fact that the coating must be sufficiently fluid to reach and cover all the recesses and joints in the couplers and sufficiently ductile so as not to crack upon relative movement between the pipe sections and the couplers. A material which meets these requirements, however, has the disadvantage that it is not sufficiently resistant to the shearing and distorting action of the soil to afford lasting protection.

It has also been proposed to fasten jointed, removable metal housings around pipe couplers during the coating operation in order to keep the coating material in place until it has hardened, and then to remove the housing. Such a procedure involves the use of cumbersome equipment and affords no protection to the coating after the housing has been removed and the pipe buried.

None of these procedures or other previous methods for protecting pipe couplers against corrosion has been entirely satisfactory. The result has been that the coupler joints were the weakest points in the pipe lines and were usually the first to corrode and fail.

According to the invention of R. G. Roberts disclosed and claimed in application No. 667,335, filed April 22, 1933, pipe couplers and the adjacent uncoated portions of the pipe are protected by enclosing them in rigid, durable shields or housings sufficiently strong to resist soil stress and sufficiently liquid-tight to retain protective coating material therein. My invention is in the nature of an improvement on the invention of R. G. Roberts. In accordance with my invention, coupler housings are composed of two or more sections each of which may be made from substantially flat pieces of material of such character as to have considerable rigidity after fabrication. These sections are so shaped that when assembled, they will form a tight substantially cylindrical shell around the coupling. While ordinarily the cylindrical shell will be circular in cross section, the cross section may be varied in shape to meet special conditions as desired, e. g. it may be oval, elliptical, etc. In such cases the end members will conform in shape to fit the shell. Furthermore, the ends of the cylindrical portion may merge into conical or other shapes without departing from my invention.

The words "cylindrical" and "cylinder" as used in this specification are used in a broad sense and are intended to include cylinders of circular and of other than circular cross section, and to refer to shapes a substantial part of which is cylindrical.

End pieces are inserted at each end of the housing between the pipe and the cylindrical shell and cooperate with the shell to completely enclose the coupling. The various sections of each housing are preferably held securely in place by suitable wires or bands which are covered with protective material so that they will not corrode and permit a falling apart of the housing.

After the housing is fastened tightly around a coupler the space between the coupler and the housing and the pipe and the housing is filled with liquid, e. g. molten, coupler compound through a suitable hole in the top of the housing. During this operation care should be taken to pour in the compound slowly enough to permit the driving out of air as effectively and completely as possible from the crevices and recesses of the coupler joint. The housing forms a permanent receptacle for the protective compound and insures that the coupler will always be protected against corrosion.

For a better understanding of the invention reference should be made to the accompanying drawing, wherein is shown by way of illustration a preferred embodiment of the invention.

In the drawing:

Fig. 1 is a side elevation partly in section showing a housing assembled over a coupling for two pipe sections, fragmentarily shown, of a pipe line and illustrates one embodiment of the invention;

Fig. 2 is a section taken on the line 2—2 of Fig. 1;

Fig. 3 is a vertical section through a modified form of housing, i. e., one having internal fastening means, and shows a preferred embodiment of the invention.

Referring to Fig. 1, numerals 1 and 2 represent pipe sections coupled together by a coupler or expansion joint 3, the sleeve 4 of which slides over the uncoated end portions of the pipe sections. The coating on the pipe sections is indicated by reference numeral 6. Sleeve 4 of the coupling surrounds the space between the ends of the pipe sections 1 and 2 indicated by dotted lines 8. Flange rings 10, drawn together by bolts 11 and nuts 12, are disposed at opposite ends of sleeve 4. By tightening the nuts 12 on the bolts 11, gaskets (not shown) underlying the flange rings 10 are brought home against the ends of the sleeve 4 and the underlying pipe surface to form a tight joint.

A housing 14, which may be made of tough fibrous material, saturated with bitumen or other suitable waterproof material, surrounds the coupler 3. This housing is substantially cylindrical in shape and is preferably formed of a cylindrical shell 16 and two end rings 17. Each end ring is composed of two semi-circular pieces 20 and 21 joined together by lap joints 22 (Fig. 1) to permit the ready assembly of the ring around a coupler already assembled on a pipe line. The exterior circumferential surface of each semi-circular piece is provided with a raised rib or tongue 23. If desired, each end ring may be made in one piece instead of two sections. In such a case the rings are slipped over the ends of the pipe sections before the pipes are coupled together.

The cylindrical shell 16 is composed of a lower semi-cylindrical shaped section 24 and an upper semi-cylindrical shaped section 25. These sections meet in lap joints 26 which provide a tight liquid-proof joint. Each section has a groove 29 extending in a semi-circle along its inner surface a short distance from the end thereof. These grooves are complemental in size and shape to the tongues 23 of the ring pieces so that a simple and effective joint is obtained between the shell sections and the rings.

The various segments of the housing are held tightly together around a coupler by means of tie-wires or bands 31. The upper and lower sections of the shell 16 are provided with external grooves 33 a short distance in from the internal grooves 29 at each end of the sections. These external grooves serve as recesses for the reception of the tie-wires 31. After the tie-wires are in place, the grooves may be filled with protective material similar to that used within the coupler housing to prevent the subsequent corrosion and deterioration of these wires when the pipe is covered with soil.

The upper section 25 of the shell is also provided with a suitable hole 35 through which the protective material is introduced into the housing. This hole may either be left open as shown in the drawing or it may be covered with a suitable flap or cap after the housing is filled.

The housing may be made of any strong, durable, noncorrosive, waterproof material, and preferably is made from a fibrous base having some degree of rigidity. The base may be composed of annual vegetable crop fibers, such as corn stalks, either raw or cooked, cotton stalks, sugar cane, flax, straw, or bagasse alone or admixed with a suitable proportion of filler, or of suitably formed paper stock (as in the manufacture of fiber conduits), or of felt furnish, or of similar fibrous products. A rigid housing may be produced by saturating such a base of suitable thickness with bituminous material.

As an alternative, the housing may be formed of a suitable mastic comprising, for example, a bituminous binder and a fibrous filler.

The housing of this invention is readily fabricated and may be made as follows: Flat shapes of the proper sizes are cut from the fibrous base and are machined to provide the shapes with the necessary tongues, grooves and lapped ends. One side of the shapes thus cut, is wetted with water and the wetted side placed in contact with a steam heated mandrel of the proper dimensions to form the coupler housing. One end of the flat shape is fastened down and the shape gradually bent around the hot mandrel. As the wet surface contacts with the hot mandrel, steam is generated, which softens the fibers, allowing them to bend. The formed shape is left for a minute or two to dry out. After drying, the resultant molded sections retain their cylindrical shape. In making the sections which are assembled to form the shell, a rigid fibrous base of approximately ¼ inch thickness may be employed. The end sections may be cut from material approximately ½ inch thick.

The molded and cut sections are then saturated with bitumen, such as vacuum distilled coal tar pitch of about 160° F. melting point, and subsequently covered with mica to prevent sticking. Alternatively the flat shapes from which the housing is made can be saturated and the saturated shapes formed into the desired semi-cylindrical configuration by a simple molding operation. Hence the housing can be fabricated readily and economically. The lapped joints are simple in design and are readily machined. Moreover, the joints and pieces are not easily damaged in shipment because of their simplicity and ruggedness. Furthermore, since the housing is composed of like sections, in the embodiment disclosed semi-cylindrical sections of regular contour, they can be readily stacked and shipped.

In applying the protective housing, the coupler is first assembled in the usual way. Ring sections 20 and 21 and the shell sections 24 and 25 are then fitted around the coupler and securely fastened together by means of the tie-wires 31. By twisting the ends of each tie-wire together, the lap joints between the various sections may be made sufficiently tight to hold fluid coupler compound. If desired, the joint may be caulked or luted with lamp wicking, oakum, wet clay or other luting material.

When the housing is completely assembled around the coupler, molten protective material, such as a coal tar pitch of a suitable melting point and at a temperature that will render it liquid is poured into the housing through hole 35. Suitable products for the purpose may be pitches or asphalts with or without fillers and having melting points of an approximate range of 100° to 140° F. The protective material should be poured in at a rate which will permit the escape of air from the recesses around the coupler. Hole 35 in the top of the housing may be closed with a suitable cover piece after the housing is filled. Grooves 33 in the outside of the housing are also filled with protective material thereby covering the tie-wires and preventing their corrosion. The pipe section may now be lowered into the ditch and, after the protective coating has cooled, covered with soil. Since many coupler compounds shrink on cooling, it is desirable in some cases to pour in additional compound several hours after the first filling and before covering with soil. Such shrinkage, however, is not usually great enough to expose the bolts of the coupler even when not topped off with additional protective material.

Fig. 3 illustrates a modified housing having internal means for holding the housing in place around the coupler. This housing may be substantially the same as that shown in Figs. 1 and 2 with the exception that the grooves 33 and tie-wires 31 may be omitted, all the fasteners being disposed within the shell of the housing where they are embedded in coupler compound and protected from corrosion. Tie-wires, or bands 38 and 39, are fastened to the inner side of lower section 24 and similar tie-wires 41 and 42 are fastened to the upper section 25 by any suitable means such as rivets or bolts. These wires are so placed that they can be twisted over the coupler bolts 11 or other part of the coupler 3 and securely hold the sections in place.

The housing may be assembled as follows: After the end rings have been mounted, the lower section 24 is brought in place and the wires 38 and 39 are looped over and tightly twisted about any convenient coupler bolts 11, thereby holding this section against the rings. The upper section 25 is then placed in position. Tie-wires 41 and 42 are passed around suitable coupler bolts 11 and then brought upward above the pipe where they are twisted together thereby drawing the upper section 25 down against the lower section 24 and rings 17 and forming a complete housing. The twisting of wires 41 and 42 is accomplished by reaching through filling hole 35. Each housing is preferably provided with two sets of tie-wires, one near each end of the housing, so that the sections may be joined together evenly and there will be no tendency for the sections to sag or fall apart.

Instead of passing the wires over the coupler bolts, and then twisting the ends as shown in the drawing, they may be passed over the pipe or coupler. In any event, when the housing is filled with the protective compound, each tie-wire will be completely embedded in and covered by the protective composition. Consequently the effective life of the fastening wires is prolonged.

Since certain changes in the constructions and methods set forth above may be made without departing from the scope of this invention, it is intended that all matter contained in the above description or shown in the accompanying drawing shall be interpreted as illustrative and not in a limiting sense.

I claim:

1. A preformed coupler housing of waterproof rigid fibrous material adapted to be permanently mounted around a pipe coupler, said housing being formed of two semi-cylindrical sections adapted to meet in longitudinal joints and be held firmly together by fastening members, said fastening members being covered with protective material.

2. In combination a plurality of pipe sections, a coupler joining said sections, a housing surrounding said coupler, said housing being composed of insulating, chemically inert material whereby it protects said coupler against ground currents and is resistant to the chemical agencies of the soil, means within said housing for holding said housing in place with respect to said coupler, said housing containing protective material for protecting both said holding means and said coupler.

3. In combination two pipe sections, a coupler joining said sections, a rigid housing constituted of fibrous material and a waterproofing saturant, surrounding said coupler, means within said housing for holding said housing in place with respect to said coupler, and protective material within said housing for protecting said holding means and said housing.

4. A protected pipe coupler comprising two pipe sections, a coupler joining said sections, and a rigid housing surrounding said coupler, the interior of said housing containing protective material, and means covered by the protective material for holding the housing in place.

5. A pipe coupler housing comprising two sections adapted to be joined together around a coupler to form a shell, each of said sections having tie-wires attached to the inner surface thereof, said tie-wires adapted to be attached to coupler bolts to hold the sections securely in place.

6. A pipe coupler housing for a coupler joint the parts of which are bolted together, said housing comprising two semi-cylindrical sections and two ring-shaped sections, all of said sections being adapted to be joined together around a pipe coupler to form a cylindrical shaped shell, the sections of said shell being held in position by tie-wires joining the interior of the shell with bolts of the coupler.

7. A housing for the protection of a fitting of an underground pipe line, comprising a plurality of segments constituted of rigid, fibrous material and end sections each composed of a plurality of segments, said fibrous material segments and said end sections adapted to be secured together to form an enclosure, surrounding a portion of the underground pipe line, for retaining protective material about the fitting to protect the latter against ground currents and against the destructive chemical and abrasive influences of the soil.

8. A housing for the protection of a fitting of an underground pipe line, said housing comprising a plurality of rigid segments of waterproof, saturated fibrous material adapted to be joined together to form a shell about the portion of the pipe line containing said fitting, a plurality of end sections adapted to fit around the pipe line and to cooperate with the shell to form closures for the ends thereof, said shell and end sections forming an enclosure about the fitting of the pipe line for receiving molten protective material and retaining the same to protect the enclosed portion of the pipe line and the fitting against ground currents and against destructive chemical and abrasive influences of the soil.

9. A pipe line comprising pipe sections and a fitting, a rigid housing surrounding said fitting, the interior of said housing containing protective material, and means covered by the protective material for holding the housing in place.

FRANK WILLIAM YEAGER.